United States Patent Office 3,517,380
Patented June 23, 1970

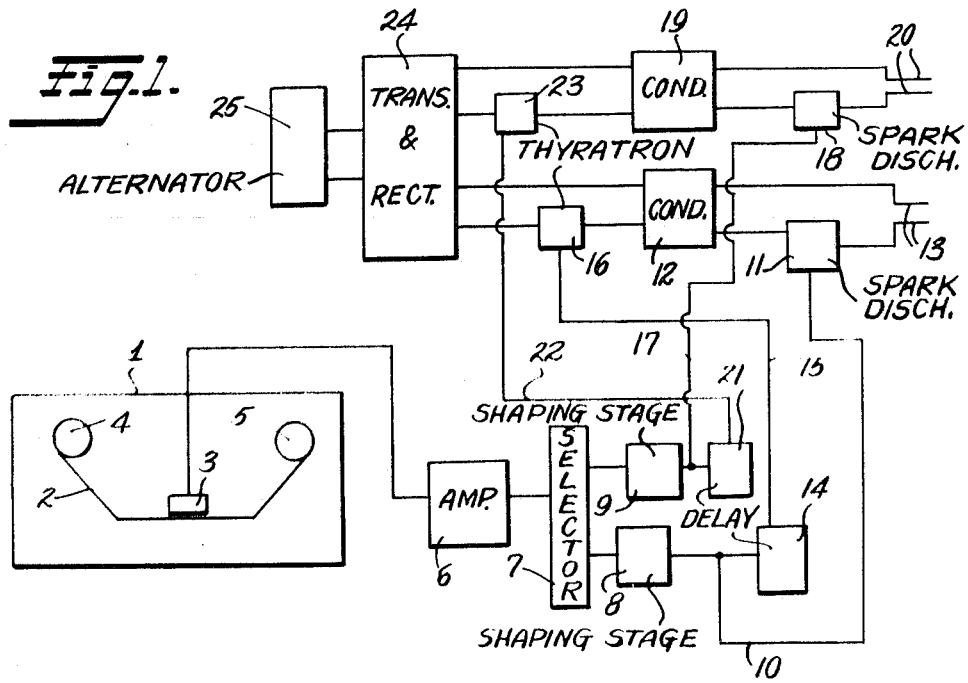
Fig. 1.
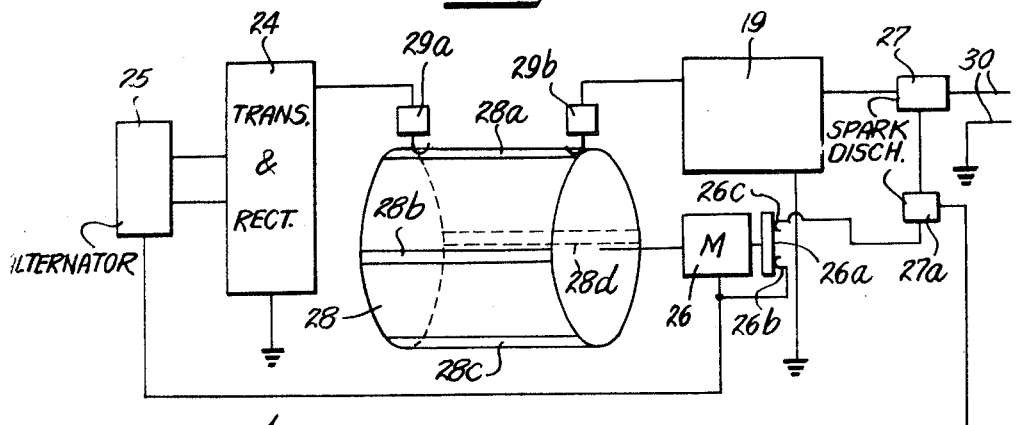
Fig. 2.
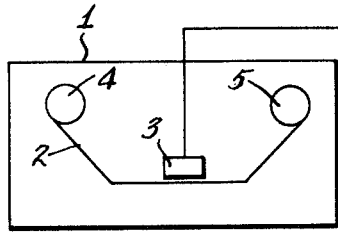
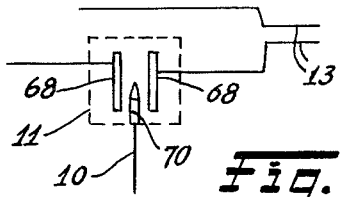
Fig. 10
INVENTORS
MAURICE BARBIER
LÉON SAYOUS
ATTORNEYS

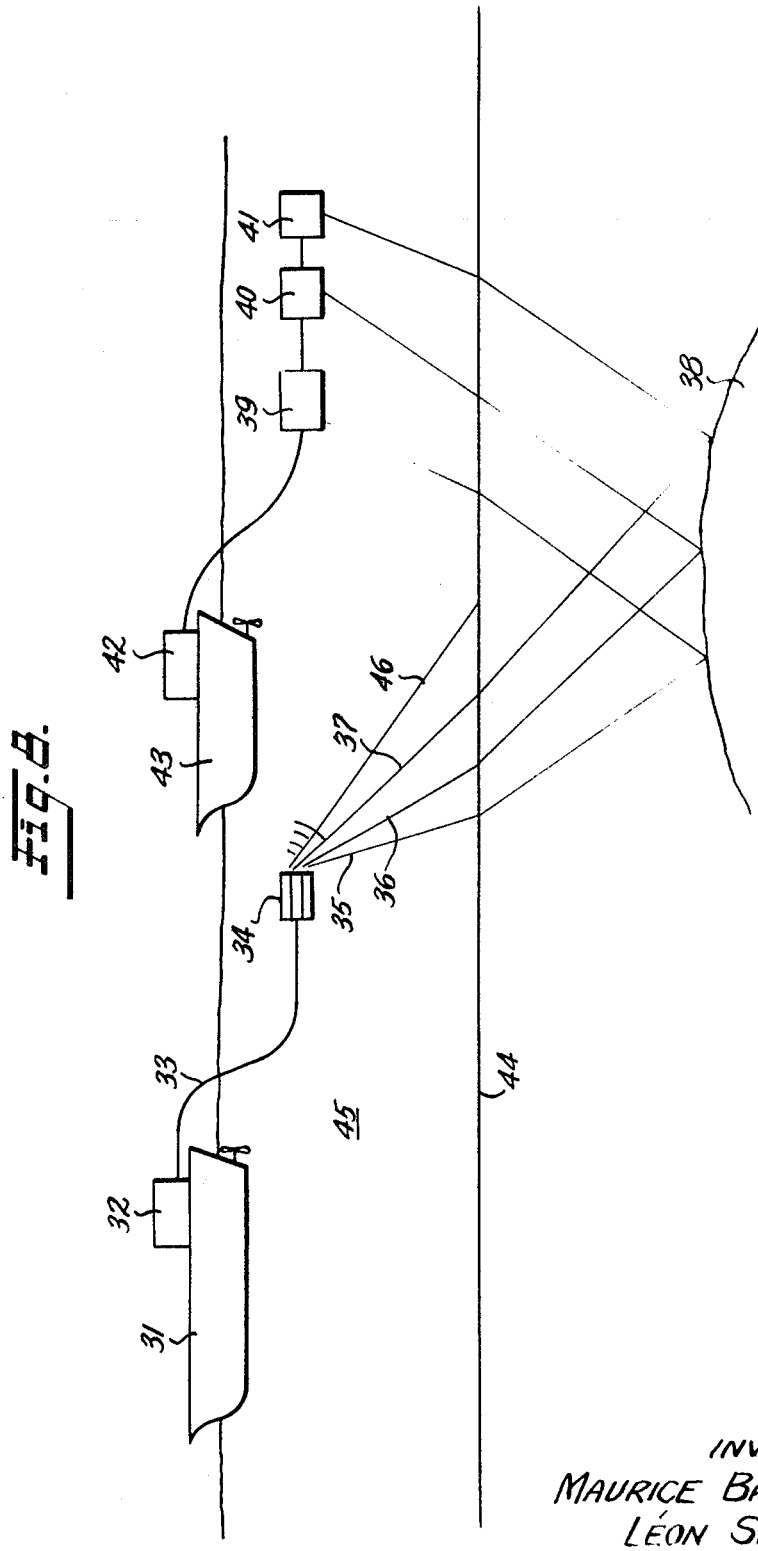

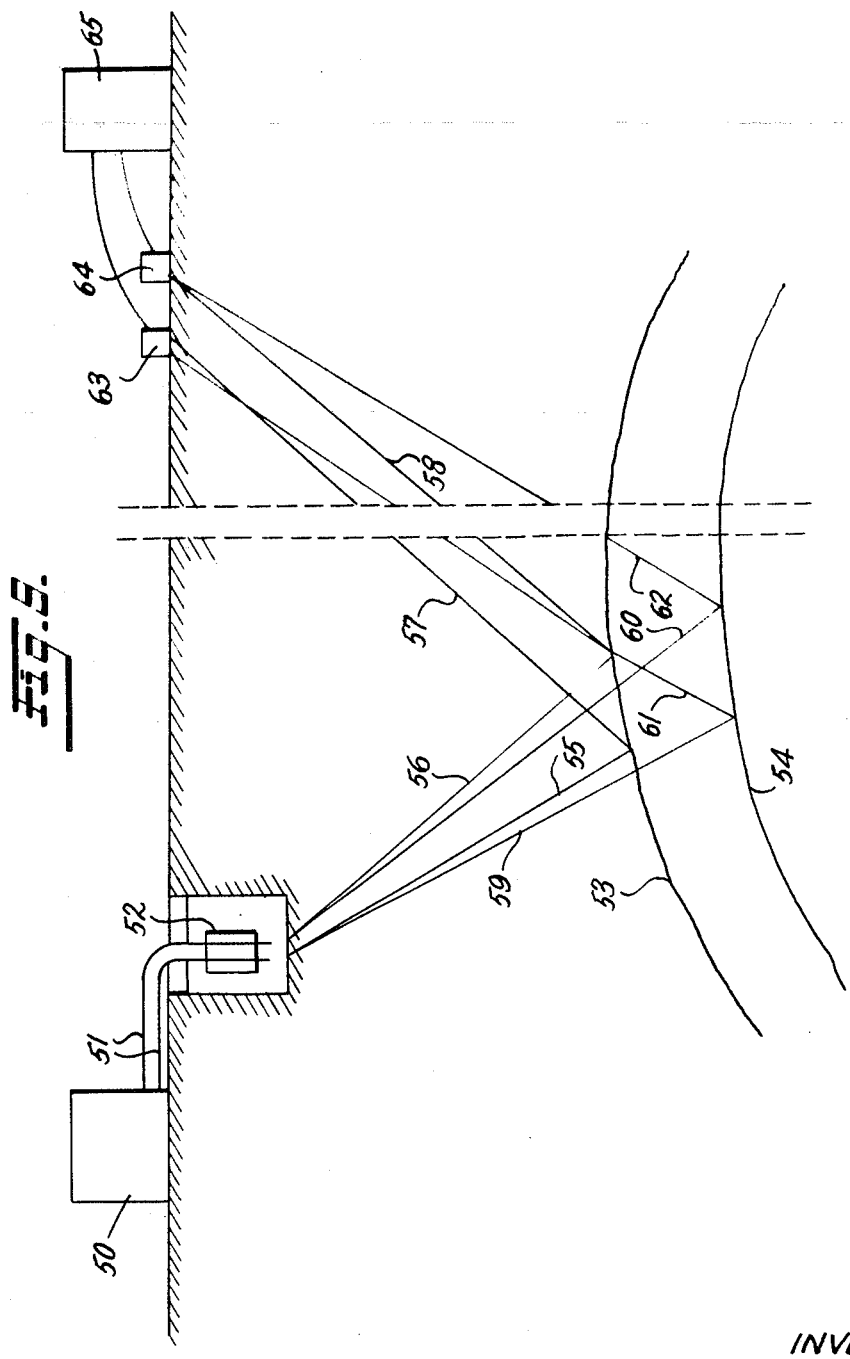

3,517,380
METHOD OF EXPLORATION BY TRANSMISSION OF MECHANICAL WAVES, INSTALLATION FOR CARRYING OUT THE METHOD AND THE APPLICATIONS THEREOF
Maurice Barbier, Ousse, and Léon Sayous, Pau, France, assignors to Societe Nationale des Petroles d'Aquitaine, Courbevoie, France, a corporation of France
Original application Dec. 27, 1967, Ser. No. 693,956. Divided and this application Dec. 30, 1968, Ser. No. 798,561
Claims priority, application France, Dec. 28, 1966, 89,069
Int. Cl. G01v 1/08, 1/38
U.S. Cl. 340—15.5
4 Claims

ABSTRACT OF THE DISCLOSURE

A method and apparatus for exploring the form and structure of a medium. An electrical signal comprising a train of successive pulses is transmitted through said medium. Different signal components corresponding to different propagation paths in said medium are received at one or more receiving stations and correlated with components of the originally transmitted signal in order to determine the signal delay time caused by a particular propagation path.

CROSS REFERENCE TO RELATED APPLICATION

This application is a division of our application Ser. No. 693,956, filed Dec. 27, 1967.

BACKGROUND OF THE INVENTION

The present invention relates to the study of the propagation of mechanical waves in a medium comprising heterogeneous layers and having discontinuities, with a view to determining the structure thereof. One such type of exploration is used particularly for the geological study of the surface layers of the earth's crust and for prospecting in general.

It is known that the principle of such studies consists in transmitting to the medium to be studied a signal which is formed of mechanical waves, sent out from a transmission station and being propagated along different paths in the material, while being subject to refractions and reflections, and in collecting these various components in different reception stations, determining their respective paths between the transmission and reception stations by the time difference between the instant of transmission of this signal and the instant of receiving the various components.

One improved method of carrying out this operation consists in that, instead of a single impulsive signal being used, such as that which is emitted by an explosive used as energy source, there is employed a non-repetitive signal formed by a transmission of mechanical waves for a certain time in accordance with a given law.

The different components of the signal picked up after being propagated along different paths are then compared, by an operation known as correlation, with the actual initial signal, in order to deduce therefrom data concerning these paths and hence concerning the form and the structure of the material being explored.

In the technique of seismic prospecting of the surface layers of the earth's crust, it is thus known to employ non-repetitive signals formed of sinusoidal or analogous waves, the frequency of which varies between the commencement and the end of the signal; a largest possible frequency band between the transmitted maximum and minimum frequencies is of interest, so that a good definition is obtained after correlation, definition being called the minimum detectable distance between two successive layers.

These signals are generally produced by vibrators set up on the surface of the ground or immersed in water at the transmission station and moved by hydraulic or electromagnetic means at frequencies controlled by any appropriate system, such as for example a magnetic drum.

However, this method of procedure presents a certain number of disadvantages; for example, the frequency band which can be caused effectively to pass into the ground is relatively limited, this being particularly due to the characteristics of the mechanical arrangement.

In addition, a coupling exists between the vibrator and the ground, which introduces phase differences between the emitted frequencies and those transmitted into the ground, and attenuations in amplitude of the transmitted frequencies.

Finally, it is well known that any source operating from the surface of the ground gives many more surface waves and shear waves than compression waves, which are the only ones actually useful in seismic prospecting. In general terms, the present invention aims at eliminating all the disadvantages previously indicated, by providing a new method of exploration by emission of mechanical waves, based on the principle referred to above, and also an installation permitting it to be carried into effect.

SUMMARY OF THE INVENTION

One object of the invention consists in providing a method and an installation permitting the transmission to the material of signals which are emitted in accordance with a predetermined law and of very varied types, and more especially signals composed of shocks or vibrations, the frequency of which can vary within very wide limits.

Another object of the invention consists in providing a method and an installation making it possible to avoid a shift in phase and an attenuation due, for example, to the coupling between the vibration generator and the ground, being produced between the signal provided at the emission station and the mechanical energy carrier signal transmitted to the material.

To this end, the present invention has for its object a method of exploration of the form and the structure of a medium, in which the said medium has transmitted thereto a non-repetitive signal consisting of a train of shocks or vibrations emitted from a transmission center in accordance with a given law, and in which different components of this signal, corresponding to different propagation paths, are picked up in at least one reception station, for correlating them with the initial signal, with a view to determining the duration of these paths, characterized in that the emitted signal is formed by a train of shocks or vibrations of variable durations separated by periods of silence of likewise variable durations, each shock being formed by a series of elementary impulses of constant unitary energy of like direction and of variable repetition frequency, the said impulses being sufficiently close together that the result is that the intensity of the energy emitted in a given time interval is a function of the time separating the elementary impulses in the said time interval.

In accordance with one form of the invention, the emission of several elementary impulses can be substantially simultaneous, the times between successive elementary impulses being equal to a given value.

According to another embodiment of the method according to the invention, the times between elementary impulses vary in accordance with a law which is imposed on the emitter.

Substantially simultaneous emission of two elementary impulses is defined as the emission of two mechanical impulses which are received by a pick-up device placed at a small distance from the source, for example, at a distance of a few metres, as if it were a question of a single and some impulse.

The impulses which are spaced by a fixed or variable time or are substantially simultaneous each produce a wave, called a unit wave; the result of the emission of a series of impulses is a series of unit waves which, combined with one another, either naturally along their paths, or by means of a filtering on reception, only permits the appearance of a resultant signal which is found to be the affine of the envelope of the train of shocks.

In a preferred embodiment of the method according to the invention, the distribution of the emission times and of the silence times is such that the reference recording of the emitted signals on a variable density film gives an image of which the distribution of the light intensity is analogous to the recording of a portion of interference rings, known under the name of Newton rings, defined by two straight lines parallel to a diameter of the said rings. The invention is also concerned with an installation for the emission of shocks for carrying out the method as previously defined, of the type comprising means for accumulating electrical energy, means for producing a spark and means for controlling the release of the sparks, characterized in that it comprises at least one discharge member connected to at least one source of electric sparks placed in a liquid in contact with the material to be explored and connected to a common center for controlling the release of the sparks, imposing a predetermined law. According to one embodiment, the control center for the release of the sparks comprises a magnetic tape on which are inscribed graphs in accordance with a predetermined arrangement, a reading head and an amplifier, the output of which is capable of being connected to the discharge member, in accordance with a law fixed in advance, by a destination selector.

In one embodiment, the installation comprises several spark sources consisting of several pairs of electrodes positioned side-by-side in the liquid, each connected to a battery of condensers by means of a discharge member.

In another embodiment, the installation comprises at least one source of electrical power connected to at least one spark generator comprising a condenser, an electrode assembly and a spark discharger, by means of a rotary connector driven by a motor.

In a preferred variant of this embodiment the rotary connector is formed by an assembly of squirrel-cage type, in which a series of parallel conducting bars is supported by two insulating rings, this assembly being driven in rotation by a motor, the speed of which can vary and the rotation of which also controls the striking arc of the pilot spark discharger with a certain shift in phase with respect to the instant of the connection carried out when one of the bars produces the connection between the voltage source and the condenser.

In one improved embodiment, the emission or transmission arrangement comprises in addition a metal plate placed at a small distance from the emitter, the said plate being situated above the emitter when the latter is immersed.

The spark discharges can be made of metallic masses connected to the condensers and situated on either side of an insulator formed with a series of holes.

Finally, the invention has for its object the application of the previously mentioned method and the installation for carrying the method into effect to geophysical prospecting operations using mechanical waves, characterized in that the succession frequency of the trains of impulses is between 0.1 c./s. and 1000 c./s. According to one particularly interesting form of application, the foregoing method and installation are used for submarine geophysical prospecting by positioning a spark source in an emission station situated beneath the surface of the sea.

According to another form of application, the foregoing method and installation are used for terrestrial prospecting from a point situated at a variable depth, preferably below the zone of surface change in the ground, by placing a spark source in a hole formed in the ground and filled with liquid.

BRIEF DESCRIPTION OF THE DRAWINGS

The invention will be better understood by means of the following description of one embodiment of an apparatus for the production of sparks in accordance with the invention and of the method which it uses, as well as their applications to seismic prospecting; this description is given by reference to the accompanying drawings, in which:

FIG. 1 represents the assembly diagram of the arrangement according to the invention, FIG. 2 represents the diagram of another arrangement according to the invention, FIG. 8 shows the use of the said arrangement for the emission of signals in marine seismology, FIG. 9 shows the use of the said arrangement for terrestrial seismology, FIG. 10 is a schematic illustration of a spark discharge device.

DESCRIPTION OF THE PREFERRED EMBODIMENT

Figure 3:
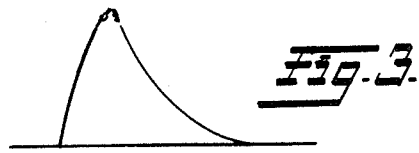
FIG. 3 represents the diagram of an elementary impulse.

Referring to FIG. 1, a magnetic tape recorder is shown at 1; inscribed on a magnetic tape 2 are graphs which, as they pass in front of a reading head 3, give electric signals of impulse type. The magnetic tape 2 passes in front of the reading head 3, which is followed by an amplifier 6. The magnetic tapes are driven by the spools 4 and 5, one of which is driven and the other is free. The signals appearing at the output of the amplifier 6 are applied by means of a selector 7 to two or more symmetrical shaping stages 8 and 9. The shaping stage 8 receives a first signal coming from the magnetic tape, while a second signal is applied to the second shaping stage 9, arranged in parallel to the first-mentioned stage, the switching towards one or other of the said stages being effected by the selector 7. The calibrated impulses leaving the shaping stage are transmitted through a line 10 to a pilot spark discharger 11, in which they cause a low power spark; this spark makes the spark discharger conductive and causes the discharge of a battery of condensers 12, permitting the emission of a spark between the two electrodes 13.

At the same time as the impulse is applied to the pilot spark discharge 11, it acts on a delay stage 14 which is for example formed by a monostable flip-flop; the delayed impulse is applied by a way of the line 15 to a hot cathode thyratron 76 and opens this thyratron.

In similar manner, the following signal is applied to the shaping stage 9, then to a pilot spark discharger 18, permitting the discharge of a battery of condensers 19 through electrodes 20. The same signal, delayed by a monostable flip-flop 21, is applied through the line 22 to a thyratron 23.

The combined transformer and rectifier 24 is formed by a voltage-raising three-phase transformer, a rectifier formed by solid diodes supporting a high voltage, a filter formed by a reactance and a battery of condensers. This transformer delivers a voltage of 11 kilovolts.

In one advantageous embodiment, the electrodes 13 and 20 are placed close to one another in a single block of insulating material. In addition, the pilot spark dischargers are equipped with a ventilation system ensuring the scavenging of the ionized air after discharge of the condensers.

The basic operation of the arrangement shown in FIG. 1 is as follows: an alternating voltage is applied to 25, which is an alternator delivering a voltage of 380 volts with a frequency of 50 c./s., the alternator delivering a power of 50 kilowatts.

The combined transformer and rectifier 24 delivers to its terminals a very high voltage of 11 kilovolts. This voltage is applied to a charging circuit of a battery of condensers 19 comprising a hot cathode thyratron 23 and a doubling reactor in series with the said condenser battery.

The introduction of the reactor causes the condenser battery to behave as an oscillating circuit delivering a voltage, the crest of which reaches 22 kilovolts. This voltage is blocked in return by the presence of the thyratrons 16 and 23.

When the thyratrons 16 and 23 are conductive, this voltage is applied to the charging of the condsenser batteries 12 and 19.

When a graph recorded on the tape 2 passes in front of the reading head 3, this graph produces an electric impulse which is amplified by 6 and is transmitted to the shaping stage 8. This signal then makes the pilot spark discharger 11 conductive. When the latter becomes conductive, the voltage of 22 kilovolts stored in the condenser battery 12 is applied to the two electrodes 13. A spark of 100 joules appears between the ends of these two electrodes, which are placed in an insulating ceramic sleeve, thus discharging the condensers at 0.41 microfarad. The period of discharge is of the order of 1 to 100 microseconds.

FIG. 10 shows, by way of example, the general arrangement of the spark discharge device 11 which is equally applicable to the discharge devices 18, 27 and 27a. As shown, the spark discharge device comprises a pair of parallel plates 68 between which is a pointed electrode 70 connected to the line 10 and which operates in the manner described.

A certain time afterwards, which time is determined by the delay stage 14, the control electric signal is applied to the thyratron 16, opening the latter and making it conductive. The combined transformer and rectifier 24 then charges the condenser battery 12, while the charging current is higher than the current corresponding to the direct holding current of the thyratron 16. The control electrode of the latter is in addition permanently polarized negatively by a voltage of lower value than the voltage delivered by the signal coming from 6. The thyratron is thus locked with a high degree of certainty, preventing any improper initiation of the high voltage source.

The functioning of the second emission assembly is identical with that of the first assembly.

Moreover, two assemblies are shown here. A large number of emission assemblies can be coupled together. It is thus seen that there is available an apparatus capable of emitting high-energy signals, because of the high repetition rate of the sparks.

In one particular embodiment, the magnetic tape can have several tracks, each track having as destination a chain of condensers and charging and discharging elements.

The arrangement according to the invention in particular makes it possible to emit signals by means of two condenser batteries 12 and 19, the signals intervening in coincidence or out of phase with one another, the coincidence or dephasing being controlled by the coincidence or dephasing of the graphs recorded on the magnetic tape. It is thus seen that the sparks appearing between the electrodes 13 and the electrodes 20 can be produced either in coincidence or out of phase.

FIG. 2 shows another embodiment of the arrangement according to the invention. An alternating voltage source is arranged at 25, this voltage source being connected to a voltage-raising transformer 24, at the output of which is incorporate da rectifier which delivers a voltage of for example 22 kilovolts. One of the output terminals of this transformer is connected to earth, while the other terminal is connected to a brush 29a. This brush comes into contact with a series of conductor bars carried by a drum 28, which drum is driven by an electric motor 26 receiving the current from a voltage source 25. When the brush 29a comes into contact with one of the conductor bars carried by the drum 28, for example, the bar 28a, the current passes through this bar. The brush 29b which comes into contact with the bar 28a at the same time as the brush 29a picks up this electric current and applies it for the charging of a condenser battery, such as 19. The motor 26 drives a disc 26a carrying a series of contacts which are staggered relatively to the bars 28a, 28b, 28c, 28d. A contactor 26b connected to the voltage source 25 rubs on the disc 26a. A second contactor 26c likewise rubs on the same disc. When a connection carried by the disc 26a connects the contactors 26b and 26c, the current passes and polarizes the central electrode of the striking arrangement 27. This polarization voltage permits the discharge of the condenser and the discharge of a spark between the two electrodes 30. Situated between the brush 26c and the striking device 27 is an AND gate 27a, which is controlled by the reading head 3. The said striking device delivers a voltage which opens the gate 27a when it detects a signal recorded on the tape 2. On the other hand, no voltage is applied to the gate 27a when there is not recording on the tape.

The arrangement according to FIG. 2 operates in the following manner.

When the drum 28 carrying the conductor bars turns under the action of the motor 26, the condenser 19 is charged when the brushes 29a and 29b come into contact with a conducting bar, such as 26a. The charging is stopped while the brushes 29a and 29b are not in contact with a conductor bar. During this stopping of the charging, the element 27 is polarized by means of the conductors carried by the disc 26a driven by the motor 26 and when one of these conductors is in contact with the brushes 26b and 26c, the said polarizing action initiating the discharge of the condenser 19, thus causing a spark. The system functions permanently and thus makes it possible for sparks to be emitted at a predetermined rate as a function of the speed of the motor. As the speed of rotation of the motor can be made variable, it is thus possible to vary the rate of repetition of the sparks. Arranged in the polarizing circuit of the arrangement 27 is an AND gate 27a, which blocks the passage of the polarization voltage as long as there is no voltage at the second input of this gate. Thus, when the gate 27 is closed, the discharge control voltage does not pass and since there is no control impulse, no sparks are observed, with the result that then a silence time is observed. The application of a voltage to the gate 27a opens the latter and the control of the striking device 27 is then effected normally. Impulses are obtained.

It is possible to combine with one another two or more arrangements in which the synchronization of the different motors 26 can be achieved. This permits simultaneous discharge sparks to be obtained, thus assuring a variation in amplitude of the emitted signals. The times during which the gates 27a of the different associated arrangements are open are independently adjustable and it is in this way possible to modulate as desired the different shocks comprising the emitted signal.

A variant of the arrangement as described above consists in omitting the brushes 29a and 29b.

FIG. 3 shows the curve of current variation in the discharge circuit as a function of time, the said current creating an elementary impulse, in which is easily distinguished the ascent time of the discharge current, that is to say, the time during which the current arriving by way of the discharger increases, and then the descent time corresponding to the discharge of the capacitance formed by the condensers 19.

This elementary energy impulse will be called a "sonon" in the remainder of the description.

Figure 4:
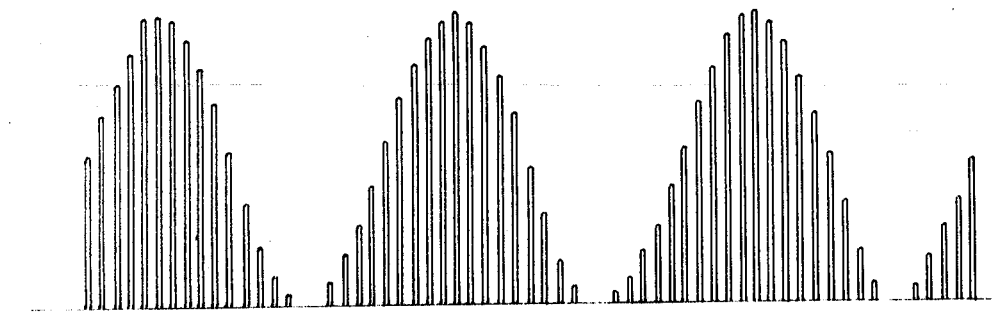
FIG. 4 represents a signal obtained by simultaneous and staggered emissions of impulses, such as represented in FIG. 3.

FIG. 4 represents a series of impulses emitted by an arrangement such as that shown in FIG. 2, in which ten pairs of electrodes are combined. The first energy impulse illustrated corresponds to the emission of 5 sonons, that is to say, 5 of the 10 arrangements have been brought into synchronism by opening 5 gates 27a. The second energy impulse corresponds to the emission of 6 sonons, that is to say, when 6 of the 10 arrangements have been brought into synchronism by opening 6 gates 27a. The third energy impulse corresponds to the emission of 7 sonons, the fourth to the emission of 8 sonons, the fifth to 9, the sixth to 10, the seventh to 9, and so on. After the fifteenth impulse, which corresponds to the emission of a single sonon, a new cycle recommences, in which one, then two, then three and then four impulses are emitted, in order to obtain an emission corresponding to the second group of FIG. 4. Then a third group is emitted, followed by a fourth. During this emission, the different motors 26 turn at a constant speed, and this has the result that the repetition frequency of the different impulses is constant. The AND gates 27a are brought into synchronism by the graphs carried on the tape 2.

After a certain travel in the ground, it is seen that the elementary pressure waves emitted as indicated in FIG. 4 do not appear individually, but there is present the envelope of this curve, which can be compared to a sinusoid, of which the axis of the ordinates would have been displaced downwardly by a value equal to a half amplitude, so that all the ordinates are positive.

Figure 5:
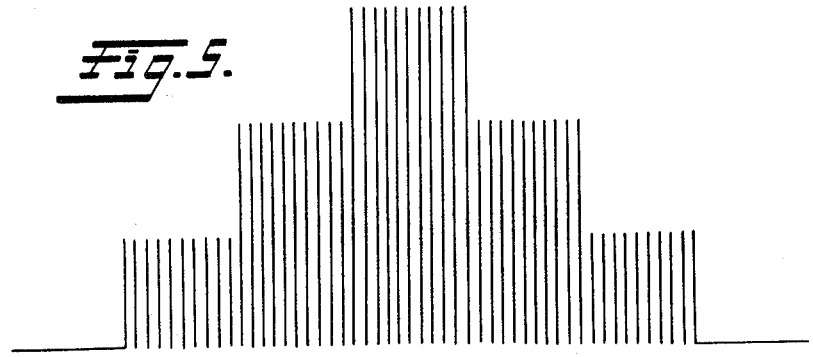
FIG. 5 shows another combination of impulses emitted in accordance with the process of the invention.

FIG. 5 represents another train of impulses, in which a single device is functioning during the 10 first impulses, 2 devices are synchronized during the following 10 impulses, 3 devices are synchronized during the 10 following impulses, only 2 devices are synchronized during the following 10 impulses and finally a single device is in operation during the 10 other following impulses. In this way, a unitary shock is obtained, which is propagated into the ground and of which it will be essentially the envelope which will be collected, since the ground behaves as a filter with respect to the unitary impulses and that only the envelope of the emitted curve is perceived. It is possible successively to repeat such shocks, the duration of which can vary as a function of the opening and closing time of the AND gate 27a.

Figure 6:
FIG. 6 shows another combination of emissions which can be used for obtaining the signal of FIG. 5.

FIG. 6 represents a series of impulses emitted by the arrangement of FIG. 2, in which the speed of rotation of the motor 26 varies. The rotation of the motor does in fact simultaneously control the charging and discharging frequencies of the condenser 19, as will be seen from the data of FIG. 2.

Figure 7:
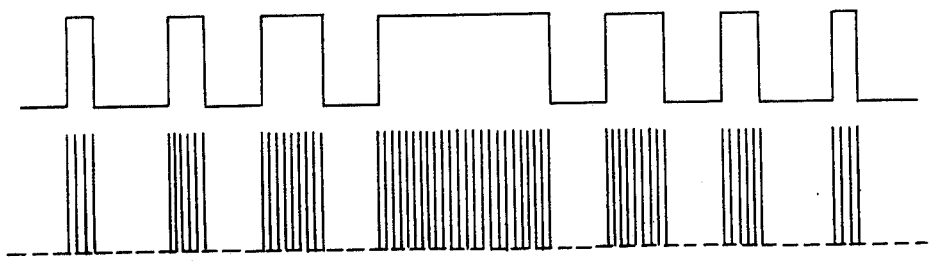
FIG. 7 represents a combination of elementary signals intended for the optical correlation and the resulting envelope curve.

FIG. 7 represents the emission diagram of a particularly advantageous train of impulses for the optical correlation. A first shock is composed of 4 unitary impulses, a second shock is composed of 6 unitary impulses, a certain period of silence being observed between these two shocks, then a third shock is emitted, a certain time after the second. During this third shock, 9 impulses are emitted and, during the fourth shock, 24 impulses are emitted, followed by a fifth shock of the same duration as the third and then a sixth of the same duration as the second and a seventh of the same duration as the first. The duration of the shocks and of the silence times is distributed in such a way that the optical density recording on a film of the shock train according to FIG. 7 corresponds to a strip cut into a series of Newton rings, the number of impulses mentioned here being given simply by way of indication.

The different sparks produce pressure waves which are repetitive in time; thus, a series of pressure waves called a shock is obtained. The mean duration of the pressure wave and the duration of the silences separating the shocks can be very different and their distribution is only regulated by the graphs recorded on the magnetic tape passing the reading head 1.

In particular, it is seen that a shock can be emitted for a certain time T. This shock of duration T is regulated by a sequence of graphs recorded on the magnetic tape 2. It is possible to reproduce a new shock at the end of a certain time, after a given silence time. The number of impulses of this new shock is chosen in advance and the total duration of the shock is also predetermined; its duration T' is absolutely independent of the duration T of the first. It is thus possible to produce series of shocks at moments which are chosen in advance. At a certain distance from the emission point, the continuous medium having a certain pass band, a certain elasticity modulus and a certain characteristic period, the impulses are not received with the same intensity. A pressure wave of which the total duration is the shock duration is also perceived. An apparent period can be associated with this shock. There is thus in fact perceived the envelope of the emitted impulses, of which the amplitude with respect to that of the impulses is reduced in a ratio which takes into account the ratio of the emission times and the silence times during the period of the shock.

The arrangement can thus be formed as an emitter of low-frequency waves of a duration which is variable and regulatable at will. The emission times and the silence times between each shock can be chosen in ratios which are as large as desired. In particular, this arrangement behaves like an emission means of very low frequency, for which there is in practice no limitation towards the low frequencies. Similarly, the arrangement acts as an emitter of medium frequencies, capable of producing pressure waves of a frequency which can exceed 1000 cycles per second. Moreover, the pressure wave is emitted with a very good efficiency.

By analogy with the collection of data by sampling, in which instantaneous values of a function are collected and in which method the function is replaced by instantaneous values, it can be said that there is sampled emission, that is to say, that by emitting signals of given value at defined instants, there is emitted, in addition to elementary impulses, a function of pressure of which the associated period is defined by the emission time. There is thus observed the phenomena of low frequency, which the earth transmits better, because the low frequency phenomena have the advantage of being less attenuated at the time of their propagation.

All the advantage which is provided by the arrangement described in connection with FIG. 1 will be seen and also the flexibility which it has for the emission of sampled signals which are of different intensities.

Actually, the magnetic tape carrying the graphs makes it possible for the signals emitted by the different chains to be brought into coincidence or out of phase with one another. In a modification, by causing several emission chains to overlap, it is possible to obtain an emission which will seem to be absolutely continuous to an observer positioned at a small distance from the emission arrangement, if the elementary silence times of the first chain are filled by emission times of the other chains.

It is also seen that if two chains are in coincidence at a certain instant, there will be obtained emission of the signal of double amplitude.

The arrangement according to FIG. 2 has the same advantages and a greater flexibility in operation.

The invention is also concerned with the application of the arrangement according to the invention to seismic prospecting, both on ground and at sea.

On the sea, the application is simple. The electrodes are in fact placed at a certain depth and the emission is effected by creation of plasma, which causes elementary pressure waves. The pressure wave trains become signals of a defined duration on reaching the bottom and are transmitted into the earth with their associated frequency in particular. The power brought into use is high, each elementary spark producing for example 100 electric joules, and if an emitter with 10 coupled chains is used, it is possible to emit 50 kilojoules of electric power for an emission of one second.

The signal having a steep front, because of the square nature of the waves which are emitted, can easily be correlated with the signal received by a detector, called a seismograph, after the signal has been reflected by a reflector horizon, usually called a mirror horizon. The function of intercorrelation of the received signal and the emitted signal can be obtained by any means, particularly with the aid of an ordinator, to which is supplied the record of the signal emitted by the generator, it being possible for the signal to be filtered in order to give the image of the transmitted signal, and the record of the signal received by a detector placed in the sea and transforming the vibrations received into an electric signal. The intercorrelation function compresses the signals which are received and makes it possible to determine the time of travel of the different waves. This mathematical operation amounts to the investigation of the phase displacement between the two functions representing the signals emitted and received at different moments, for which there is the maximum coherence. The moment of emission is determined by the function of the autocorrelation of the emitted signal. It is possible, by comparing the two functions, to determine the travel time of the mechanical waves in the earth.

The mechanical waves can be emitted in several ways. It is possible to emit a train of waves of fixed associated frequency for a certain time, and then after a certain time, to emit a train of waves of different frequency, operating in such a way that the wave trains are in phase at a given moment, preferably on commencing the emission. This is achieved by means of the programmed tape. The signals received are then added. A reflected signal is thus reinforced, because all the signals emitted with the same phase are in coincidence and the background noise, being of uncertain nature, is at least partially eliminated. A definition of the reflector horizon is thus obtained, this definition becoming sharper as the proportion of emitted medium frequencies is larger. This method is of greater interest when observing mirror horizons which are increasingly closer. It is also possible to emit wave trains of which the programme fixes the distribution of frequencies, this necessitating the use of correlation functions.

One special type of emission which is particularly advantageous for the optical correlation has been defined. In order to define this in a more precise manner, it is necessary to refer to the theories of classical physics.

It is known that if a system composed of a flat reflector and a transparent section of a sphere in point contact with the plate is illuminated with a beam of coherent light, a series of circular interference fringes is observed, these being called "Newton rings."

By moving along a diameter on the figure representing these rings, there is observed a continuous variation in the light intensity in accordance with a law which we are defining as the Newton Ring Law. In a modification, the law of distribution of the intensities of the shocks follows a Newton ring law.

In another more simple modified form, the shocks of variable amplitude are replaced by shocks of constant amplitude separated by silence times, the law of distribution of the means of each of the shocks corresponding to the law of distribution of the maxima of intensity in the Newton ring law and the means of the silences corresponding to the minima of intensity of the Newton ring law.

The application to terrestrial geophysics is possible. In effect, the emission arrangement, that is to say, essentially the insulator containing the electrodes, correctly connected to the condensers and to the discharge system, is immersed in a cavity filled with a fluid such as water. The signals are thus emitted in the water and transmitted to the earth.

It is possible to assure the communication between two points by correctly modulating the emitted waves which, because of their associated low frequency, are propagated over very large distances.

FIG. 8 represents diagrammatically the use of the arrangement according to the invention for marine seismic-prospecting.

The current source and the generator of electric signals are mounted on the ship 31, the said assembly being represented at 32. A cable 33 connects the electric signal generator to the electrodes placed inside an insulating cylinder 34, the ends of the electrodes extending a few millimeters beyond the rear face of the insulating cylinder.

When signals are emitted at 34, a series of sparks is produced, as indicated above. These sparks cause a series of mechanical waves, which are propagated in the liquid medium 44; these waves are propagated beneath the sea bed 44, and it is possible to draw lines associated with these waves, such as 35, 36 and 37. These rays pass through the interface between the liquid medium 45 and the solid subsoil 44 and are reflected on a mirror horizon, such as 38. The reflected rays are detected by seismographs 39, 40 and 41, connected to a data treatment assembly 42, which enable the signals originating from the seismographs 39, 40 and 41 to be recorded.

In FIG. 8, the data treatment arrangement is shown carried by a second ship 43, but this arrangement can equally well be carried by the first ship 31. There is also shown a ray 46 which is not detected by the seismographs.

The operation of the arrangement being used is simple: the wave trains are transmitted into the medium 44 with relative reinforcement of the proportion of waves of which the associated frequency is low, and are propagated as such into the earth. These waves are reflected on the mirror horizon 38 and detected by the seismographs 39, 40 and 41. The function of intercorrelating the signal emitted at 34 and each of the signals received at 39, 40 and 41 make it possible for the various mechanical waves emitted at successive moments in 34 to be compressed so as to obtain a representation close to that which the representation would be for the reception of a single impulse signal at 39, 40 and 41. The use of these intercorrelation functions and of the autocorrelation function makes it possible to define the time of travel of the mechanical waves in the earth. On the other hand, since the speed of these waves is known, the depth of the mirror horizon 38 is thereby established.

FIG. 9 represents the emission of a signal using the arrangement according to the invention on earth.

The signal generator 50 transmits signals to the emission head 52 by way of cables 51, said head being arranged in a cavity, which can be of any desired dimensions, the said cavity being filled with water. The lower part of this cavity is preferably situated below the altered surface zone which is commonly called the "weathering zone."

The arrangement 50 is set in operation, this permitting the emission of signals at 52; these signals, inside the earth, are transmitted as a group with a low associated frequency.

The lines 55 and 56 represent the path of the rays which are reflected on a horizon 53, these rays being reflected along 57 and 58 and detected by the seismographs 63 and 64 placed on the earth's surface, or in cavities at a certain depth. A data treatment arrangement 65 permits the electric signals emitted by 63 and 64 to be analyzed. Likewise, rays 59 and 60 are reflected on a second mirror horizon 54 and are reflected along 61 and 62 and are detected by the same seismographs 63 and 64 connected to the data treatment unit 63.

The time separating the arrival of the two signals emitted in coincidence makes it possible to determine the distance separating the two reflective horizons 53 and 54; this time becomes the better defined, as the intercorrelation function between the received signal and the emitted signal becomes sharper, that is to say, as the frequency range of the received signals becomes wider.

We claim:

1. A device for the exploration of the form and structure of a medium, comprising: a source of alternating current; transformer means for increasing voltage from said source; rectifying means for rectifying said increased voltage into direct current; first circuit means directing said direct current to an electrical energy accumulator; switching means in said first circuit means; a tape recording and tape reading means for controlling said switching means for intermittently opening and closing said first circuit means in accordance with information recorded on said tape to thereby intermittently charge said accumulator with electrical energy; a further circuit connecting said accumulator to spark generating means; a control member in said further circuit for rendering said further circuit conductive or non-conductive; said tape recording controlling operation of said control member.

2. A device as defined in claim 1 including a plurality of said first circuit means, switching means, accumulators, further circuits, spark generating means, and control members; all of said switching means and control members being controlled by said tape recording.

3. A device as defined in claim 1 wherein said switching means comprises an insulating drum having at least one conducting bar thereon; a motor for rotating said drum; and contact means arranged to engage said bar in one position of rotation of said drum to close said first circuit means; said motor being connected to said source of alternating current.

4. A device as defined in claim 1 wherein said control member comprises two parallel plates and a control electrode therebetween; a gate means and a delay means connected between said tape reading means and said switching means whereby a signal from said tape reading means is first applied to said control member to render said further circuit non-conductive and later, after a delay, is applied to said switching means, to close said first circuit.

References Cited

UNITED STATES PATENTS

| | | | |
|---|---|---|---|
| 2,167,536 | 7/1939 | Suits | 181—.5 X |
| 3,133,231 | 5/1964 | Fail et al. | 181—.5 X |

RODNEY D. BENNETT, Primary Examiner

D. C. KAUFMAN, Assistant Examiner

U.S. Cl. X.R.

181—0.5; 340—7, 12